Jan. 29, 1935.   F. J. DAHNKEN ET AL   1,989,083
DETACHABLE HANDLE FOR SPINDLES
Filed Aug. 14, 1933
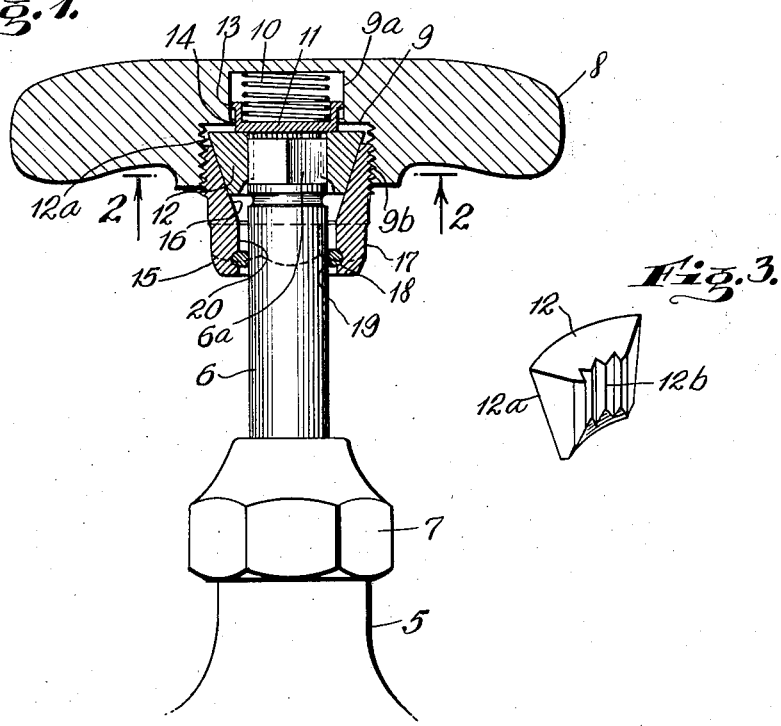
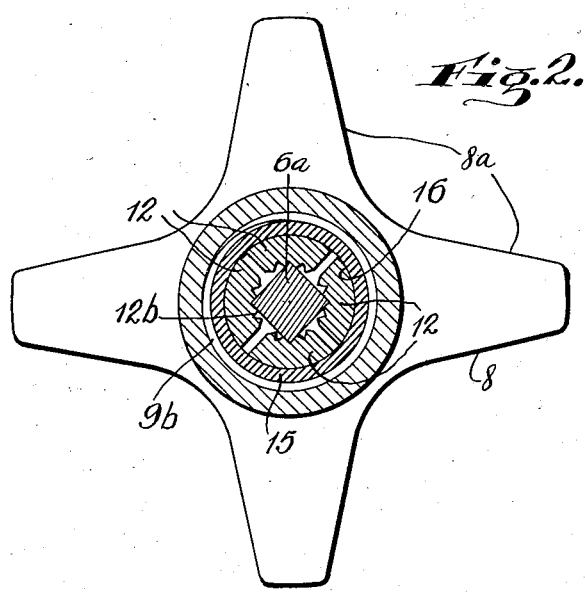
INVENTORS
FREDERICK J. DAHNKEN
ROBERT H. DAHNKEN
BY
ATTORNEY Patented Jan. 29, 1935

1,989,083

UNITED STATES PATENT OFFICE 1,989,083

DETACHABLE HANDLE FOR SPINDLES

Frederick J. Dahnken and Robert H. Dahnken, Floral Park, N. Y.

Application August 14, 1933, Serial No. 684,948

6 Claims. (Cl. 287—53)

This invention relates to handle or knob constructions for use in connection with spindles of various kinds and classes for rotating said spindles to perform predetermined operations; and the object of the invention is to provide means on the handle for detachably coupling the same with a spindle to securely retain the handle on the spindle, and still further, to provide a coupling means of the class described whereby the handle may be coupled with spindles of different sizes within predetermined limits; a further object being to provide a handle of the class described with coupling means in the form of a plurality of jaws, with means for moving the jaws radially to adjust the same to spindles of different sizes, and further, to securely retain the handle against displacement with respect to the spindle; a further object being to provide means on the handle for tensionally supporting said jaws in engagement with a lock sleeve or nut employed for moving the same into operative position; a still further object being to provide a packing and guide ring for engaging the spindle outwardly of said jaws; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of our improvement are designated by suitable reference characters in each of the views, and in which:

Fig. 1 is a sectional view through a handle made according to our invention, indicating one method of its use upon a spindle.

Fig. 2 is a section on the line 2—2 of Fig. 1; and,

Fig. 3 is a perspective view of one of a number of jaw members which we employ.

For the purpose of illustrating one practical use of the invention, we have indicated at 5 in Fig. 1 of the drawing a part of a fixture, such for example as a valve casing, faucet casing or the like controlling hot and cold water supplies, the valve spindle 6 passing through and projecting beyond a packing and retaining nut 7 constituting part of the fixture. Secured to the spindle or valve stem 6 is one of our improved handle constructions 8, which as shown, is in the form of a knob such as commonly employed in faucets and having four radially extending arms 8a, by means of which the handle or knob may be rotated in opening and closing the valve through the spindle 6.

In spindles of the class under consideration, it is common to provide at the free end thereof an angular end 6a which in the construction shown is square in cross sectional form. The handle 8 is provided with a large recess or chamber 9 centrally of the lower surface thereof and a smaller chamber 9a, in the latter of which is arranged a coil spring 10 which operates to normally extend a thimble-shaped button 11 outwardly into the chamber 9 to engage a plurality of jaw members 12. The button 11 has extending stops or flanges 13 engaging corresponding inwardly extending flanges 14 at the outer end of the recess 9a to limit the outward movement of the button.

The recess or chamber 9 is internally threaded as seen at 9a to receive a lock sleeve or nut 15, the bore of which is beveled at its inner end as seen at 16 to cooperate with correspondingly beveled outer walls 12a on the jaw members 12 as clearly seen in Fig. 1 of the drawing. The inner surface of the jaw members 12 is fashioned to form a plurality of fine teeth 12b which are disposed in a plane paralleling the axis of the spindle 6. These teeth are adapted to engage the spindle or the angular portion 6a thereof as is clearly illustrated in Fig. 2 of the drawing to firmly grip and support the handle 8 upon the spindle 6 as well as key said handle to the spindle. The sleeve or nut 15 has a hexagon or other surface 17, by means of which a suitable wrench may be applied thereto to secure the jaws 12 to the spindle, as will be apparent.

In some uses of the device, we provide an annular groove 18 in the bore of the nut 15 adjacent the outer end thereof, and arrange in said groove a packing 19 to engage the spindle 6. This packing may be employed to prevent moisture from entering the nut 15 or may be employed to steady and support said nut upon the spindle. In this connection, it will be understood that in some uses of the invention, and especially where the handle is adaptable to spindles of given sizes, the straight bore portion 20 of the nut 15 may be made to fit snugly upon the spindle, thus eliminating the necessity of employing the packing 18. However, regardless of this fact, the use of the member 18 is not absolutely essential.

Our improved handle construction lends itself to practical use as a replacement part for the spindles of various types of plumbing fixtures or to the spindles of valves of various kinds and classes, especially wherein the spindles of different manufacturers are of different construction and vary in diameters. It will be apparent that the manner of mounting and operating the jaws 12 will adapt the handle to spindles of different diameters within the limits of the design of the handle, it being understood that the handle may be changed in size to suit different size spindles and the jaw members constructed of such size and dimensions as to adapt them to different uses. For plumbing fixtures, a range of approximately one-eighth of an inch in the difference in diameters will be sufficient to care for the various types of spindles employed. However, in other uses, this difference may be greater, and it will be essential to construct the handle accordingly.

In assembling the parts of the handle, after the button 11 has been mounted in position upon the spring 10, the jaws 12 are placed in the chamber 9 and the sleeve nut 15 is then placed in position by inserting a pin or other tool therethrough to depress the button 11, which will cause the jaws 12 to drop upon said button, providing the necessary clearance space for the insertion of the threaded end of the nut 15, after which this nut is tightened by hand sufficiently to hold the parts in assembled position.

In coupling the handle to the spindle, the spindle is frictionally passed through the packing ring 18, when employed, to bring the square or angular end 6a thereof within and between the jaws 12 when in extended position, after which the nut 15 is tightened to force the jaw members inwardly and radially by the action of the beveled surfaces 16 and 12a so as to firmly grip and secure the jaw members and handle to the shaft 6, as will be apparent.

With our improved handle construction, it will be understood that a plumber, plumbing supply house or the like, may stock one size only of handles in the different patterns or designs that may be required, and these, when constructed according to our invention, will be adaptable for universal use upon the valves, faucets or other fittings of the different manufacturers, thus saving the plumber, merchant or distributor from carrying an excessive stock of the different sizes and types of handles, in accordance with the common practice.

At the same time, it will be understood that the manufacturing cost is materially reduced, and thus the retail price placed at a minimum by reason of the fact that the manufacturer can go into large production of the handles and eliminate the necessity of making a few handles of many sizes and styles.

It will be understood that while we have illustrated and referred to our invention as applicable to plumbing fixtures, the same may be used in conjunction with the spindles of other apparatus or devices of various kinds and classes, and especially wherein handles are subjected to breakage and replacement thereof is found necessary, and also wherein it is desirable to securely retain and lock a handle against rotation with respect to a spindle, it being understood that our invention eliminates the necessity of using set screws and similar devices commonly employed in handle constructions for retaining the handles to the spindles.

It will also be understood that while we have shown certain details of construction for carrying our invention into effect and have illustrated a handle of one contour, our invention is not limited in these respects and various changes in and modifications of the construction herein shown and described may be made within the scope of the appended claims without departing from the spirit of our invention or sacrificing its advantages.

Having fully described our invention, what we claim as new and desire to secure by Letters Patent, is:

1. A handle of the class described provided with a large socket opening through one side face thereof, a nut in threaded engagement with said socket, the bore of the nut at the inner end thereof being beveled, a plurality of independent jaw members arranged within said socket and having beveled walls cooperating with the beveled walls of said nut whereby inward movement of the nut will move said jaw members inwardly and radially, the outer end portion of the nut projecting beyond the handle member to form a gripping surface by means of which said nut is rotatable with respect to the handle member, a spring operating member within said socket and cooperating with the jaw members to support the same in engagement with said nut, the bore of the nut at the outer end thereof being of greater diameter than the largest diameter of the inner surfaces of said jaw members when arranged in said socket, and the bore of said nut adjacent the outer end thereof having a packing ring.

2. A handle for detachable mounting with a spindle, said handle including a large socket portion into which one end of a spindle is adapted to be placed, a nut mounted in the socket and in threaded engagement therewith, a plurality of independent jaw members arranged within said socket and nut and movable inwardly and radially by inward movement of the nut with respect to the handle member, a spring actuated disk centrally of the bottom wall of the socket and normally engaging said jaw members to support the same in engagement with said nut and against which the end of the spindle is adapted to press to permit the placement of the end of the spindle within said jaw members in the operation of coupling the handle with said spindle.

3. A handle for detachable mounting with a spindle, said handle including a large socket portion into which one end of a spindle is adapted to be placed, a nut mounted in the socket and in threaded engagement therewith, a plurality of independent jaw members arranged within said socket and nut and movable inwardly and radially by inward movement of the nut with respect to the handle member, a spring actuated disk centrally of the bottom wall of the socket and normally engaging said jaw members to support the same in engagement with said nut and against which the end of the spindle is adapted to press to permit the placement of the end of the spindle within said jaw members in the operation of coupling the handle with said spindle, and means for retaining said disk against displacement from said socket.

4. A handle for detachable mounting with a spindle, said handle including a large socket portion into which one end of a spindle is adapted to be placed, a nut mounted in the socket and in threaded engagement therewith, a plurality of independent jaw members arranged within said socket and nut and movable inwardly and radially by inward movement of the nut with respect to the handle member, a spring actuated disk centrally of the bottom wall of the socket and normally engaging said jaw members to support the same in engagement with said nut and against which the end of the spindle is adapted to press to permit the placement of the end of the spindle within said jaw members in the operation of coupling the handle with said spindle, said nut extending beyond the handle to form a gripping surface by means of which the same may be operated and the bore of the nut being of greater diameter than that of the spindle in connection with which the handle is mounted.

5. A handle for detachable mounting with a spindle, said handle including a large socket portion into which one end of a spindle is adapted to be placed, a nut mounted in the socket and in threaded engagement therewith, a plurality of independent jaw members arranged within said socket and nut and movable inwardly and radially by inward movement of the nut with respect to the handle member, a spring actuated disk centrally of the bottom wall of the socket and normally engaging said jaw members to support the same in engagement with said nut and against which the end of the spindle is adapted to press to permit the placement of the end of the spindle within said jaw members in the operation of coupling the handle with said spindle, said nut extending beyond the handle to form a gripping surface by means of which the same may be operated and the bore of the nut being of greater diameter than that of the spindle in connection with which the handle is mounted, and a flexible ring arranged in the bore of said nut for engagement with said spindle.

6. A handle for detachable mounting with a spindle, said handle including a large socket portion into which one end of a spindle is adapted to be placed, a nut mounted in the socket and in threaded engagement therewith, a plurality of independent jaw members arranged within said socket and nut and movable inwardly and radially by inward movement of the nut with respect to the handle member, a spring actuated disk centrally of the bottom wall of the socket and normally engaging said jaw members to support the same in engagement with said nut and against which the end of the spindle is adapted to press to permit the placement of the end of the spindle within said jaw members in the operation of coupling the handle with said spindle, said nut extending beyond the handle to form a gripping surface by means of which the same may be operated and the bore of the nut being of greater diameter than that of the spindle in connection with which the handle is mounted, a flexible ring arranged in the bore of said nut for engagement with said spindle, and means in the nut for engaging the spindle at a point spaced with respect to the engagement of the jaw members therewith.

FREDERICK J. DAHNKEN.
ROBERT H. DAHNKEN.